(12) United States Patent
Yu et al.

(10) Patent No.: US 10,909,747 B2
(45) Date of Patent: Feb. 2, 2021

(54) SYSTEMS AND METHODS FOR PROVIDING IMMERSIVE GRAPHICAL INTERFACES

(71) Applicant: FACEBOOK TECHNOLOGIES, LLC, Menlo Park, CA (US)

(72) Inventors: Agatha Yick Jun Yu, San Francisco, CA (US); Matthew Alan Scott, Snoqualmie, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 39 days.

(21) Appl. No.: 15/938,317

(22) Filed: Mar. 28, 2018

(65) Prior Publication Data

US 2019/0304166 A1    Oct. 3, 2019

(51) Int. Cl.
*G06T 19/00* (2011.01)
*G06T 15/20* (2011.01)
*G06F 3/0484* (2013.01)
*G06F 3/0481* (2013.01)

(52) U.S. Cl.
CPC .......... *G06T 15/20* (2013.01); *G06F 3/04815* (2013.01); *G06F 3/04845* (2013.01); *G06T 2200/24* (2013.01)

(58) Field of Classification Search
CPC .............................. G06T 19/006; G06T 15/20
See application file for complete search history.

(56) References Cited

U.S. PATENT DOCUMENTS

| | | | | |
|---|---|---|---|---|
| 2013/0016102 | A1* | 1/2013 | Look | G06T 15/20 345/426 |
| 2013/0182077 | A1* | 7/2013 | Holz | H04N 5/232 348/46 |
| 2014/0002492 | A1* | 1/2014 | Lamb | G06F 1/163 345/633 |
| 2015/0212688 | A1* | 7/2015 | Mcmillan | G06F 3/04815 715/850 |
| 2017/0031502 | A1* | 2/2017 | Rosenberg | G06F 3/017 |
| 2017/0358137 | A1* | 12/2017 | Auten | H04L 67/12 |

* cited by examiner

*Primary Examiner* — Yi Yang
(74) *Attorney, Agent, or Firm* — FisherBroyles, LLP (57) ABSTRACT

The disclosed computer-implemented method may include (i) associating a planar element within a virtual environment with an alternate virtual environment and (ii) rendering the virtual environment such that (A) the alternate virtual environment is framed within the planar element, (B) at least one rendered element of the alternate virtual environment renders at a distal depth beyond a proximal depth of the planar element within the virtual environment, and (C) altering a viewpoint within the virtual environment relative to a position of the planar element within the virtual environment produces a parallax effect between the virtual environment and the rendered element of the alternate virtual environment due at least in part to the rendered element of the alternate virtual environment being rendered at the distal depth beyond the proximal depth of the planar element within the virtual environment. Various other methods, systems, and computer-readable media are also disclosed.

20 Claims, 12 Drawing Sheets

SYSTEMS AND METHODS FOR PROVIDING IMMERSIVE GRAPHICAL INTERFACES

BACKGROUND

Turning on a virtual reality system may be the beginning of a thrilling experience, one that may be more immersive than almost any other digital entertainment or simulation experience available today. Virtual reality systems may enable users to travel through space and time, interact with friends in a three-dimensional world, or play video games in a radically redefined way. Virtual reality systems may also be used for purposes other than recreation—governments may use them for military training simulations, doctors may use them to practice surgery, and engineers may use them as visualization aids.

In any use of a virtual reality system, making the experience as immersive as possible may be critical to user engagement. At the same time, clear and intuitive interfaces are important for efficiently navigating any computing environment, and virtual reality environments pose no exception to this rule.

SUMMARY

As will be described in greater detail below, the instant disclosure describes systems and methods for providing immersive graphical interfaces. As will be explained in greater detail below, a graphical interface for a virtual reality system may provide an immersive three-dimensional environment with apparent views into an alternate three-dimensional environment via a tile (e.g., acting as a user interface element), creating a parallax effect between the immersive three-dimensional environment and the alternate three-dimensional environment as shown via the tile.

In one example, a computer-implemented method for providing immersive graphical interfaces may include (i) associating a planar element within a virtual environment with an alternate virtual environment and (ii) rendering the virtual environment such that (A) the alternate virtual environment is framed within the planar element, (B) at least one rendered element of the alternate virtual environment renders at a distal depth beyond a proximal depth of the planar element within the virtual environment, and (C) altering a viewpoint within the virtual environment relative to a position of the planar element within the virtual environment produces a parallax effect between the virtual environment and the rendered element of the alternate virtual environment due at least in part to the rendered element of the alternate virtual environment being rendered at the distal depth beyond the proximal depth of the planar element within the virtual environment.

In some examples, the computer-implemented method may render the virtual environment within a virtual reality system.

In some embodiments, the virtual environment may include a graphical user interface. In these embodiments, the planar element may include an element of the graphical user interface. Accordingly, in some examples, the method may further include (i) receiving, via the graphical user interface, an input directed to the planar element and (ii) performing an action relating to a virtual reality application that includes the alternate virtual environment, where the action is responsive to (A) identifying an association between the planar element and the alternate virtual environment and (B) the input directed to the planar element. In addition, in some examples the action may replace the virtual environment with the alternate virtual environment.

Although the alternate virtual environment may be framed within the planar element, the planar element may be positioned within the virtual environment, such that elements of the virtual environment may be obscured by the planar element. Thus, in some examples, altering the viewpoint within the virtual environment relative to the position of the planar element within the virtual environment may reveal a portion of the virtual environment otherwise obscured by the planar element.

In some examples, altering the viewpoint within the virtual environment relative to the position of the planar element within the virtual environment may include altering the viewpoint within the virtual environment. Additionally or alternatively, altering the viewpoint within the virtual environment relative to the position of the planar element within the virtual environment may include altering the position of the planar element within the virtual environment.

In some embodiments, the computer-implemented method may further include receiving, via a virtual reality interface, an input to manipulate the planar element. In these embodiments, altering the viewpoint within the virtual environment relative to the position of the planar element within the virtual environment may include manipulating the planar element in response to the input. In some examples, the input may include an input to manually grasp the planar element. Additionally or alternatively, the input may include a hand movement after manually grasping the planar element.

In addition, a corresponding system for providing immersive graphical interfaces may include several modules stored in memory, including an association module and a rendering module, and one or more physical processors that execute the modules. For example, the association module may associate a planar element within a virtual environment with an alternate virtual environment. The rendering module may render the virtual environment such that (i) the alternate virtual environment is framed within the planar element, (i) at least one rendered element of the alternate virtual environment renders at a distal depth beyond a proximal depth of the planar element within the virtual environment, and (i) altering a viewpoint within the virtual environment relative to a position of the planar element within the virtual environment produces a parallax effect between the virtual environment and the rendered element of the alternate virtual environment due at least in part to the rendered element of the alternate virtual environment being rendered at the distal depth beyond the proximal depth of the planar element within the virtual environment.

In some examples, the above-described method may be encoded as computer-readable instructions on a computer-readable medium. For example, a computer-readable medium may include one or more computer-executable instructions that, when executed by at least one processor of a computing device, may cause the computing device to (i) associate a planar element within a virtual environment with an alternate virtual environment and (ii) render the virtual environment such that (A) the alternate virtual environment is framed within the planar element, (B) at least one rendered element of the alternate virtual environment renders at a distal depth beyond a proximal depth of the planar element within the virtual environment, and (C) altering a viewpoint within the virtual environment relative to a position of the planar element within the virtual environment produces a parallax effect between the virtual environment and the rendered element of the alternate virtual environment due at least in part to the rendered element of the alternate virtual environment being rendered at the distal depth beyond the proximal depth of the planar element within the virtual environment.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to providing immersive graphical interfaces. As will be explained in greater detail below, A graphical interface for a virtual reality system that provides an immersive three-dimensional environment with apparent views into alternate three-dimensional environments. A planar element (e.g., a tile acting as a user interface element) is set within an immersive three-dimensional environment. Instead of displaying a static flat image, the tile frames a view of an alternate virtual environment. The view of the alternate virtual environment changes according to the viewpoint of the user and/or according to the position of the tile. Because the effective depth of the alternate virtual environment as seen through the tile is greater than the depth of the tile relative to the user, a change in viewpoint creates a parallax effect between the immersive three-dimensional environment and the alternate virtual environment viewed via the tile.

By providing two-dimensional graphical interface elements embedded within an immersive three-dimensional, the systems and methods described herein may provide intuitive and easily navigable interfaces while maintaining immersion and engagement with a virtual environment. In addition, by showing an alternate virtual environment via an interface element, these systems and methods may simultaneously improve immersion while conveying information about the interface element. By showing the alternate virtual environment with a parallax effect, these systems and methods may further improve immersion as well as enable a user to intuitively gather additional information (e.g., in the form of different views of the alternate virtual environment) through natural movements (e.g., head movements to view the alternate virtual environment from a different angle and/or hand movements to move the interface element to provide different views of the alternate virtual environment).

In addition, the systems and methods described herein may improve the functioning of computing devices. For example, the systems and methods described herein may improve the functioning of a computing device by improving a graphical user interface used to operate the computing device. In particular, these systems and methods may improve a computing device by making it easier, more intuitive, and/or more engaging for users to discover, locate, and/or navigate to relevant functions and/or applications while minimizing user frustration, confusion, and/or disinterest when attempting to operate the computing device. In some examples, these systems and methods may more effectively unlock the advantages of a user's computing device by providing a graphical user interface that helps a user to access functions and/or applications when needed. Likewise, the systems and methods described herein may improve the functioning of a virtual reality system (e.g., a virtual reality headset) by providing effective, intuitive, and/or immersive interfaces for the virtual reality system.

Figure 1:
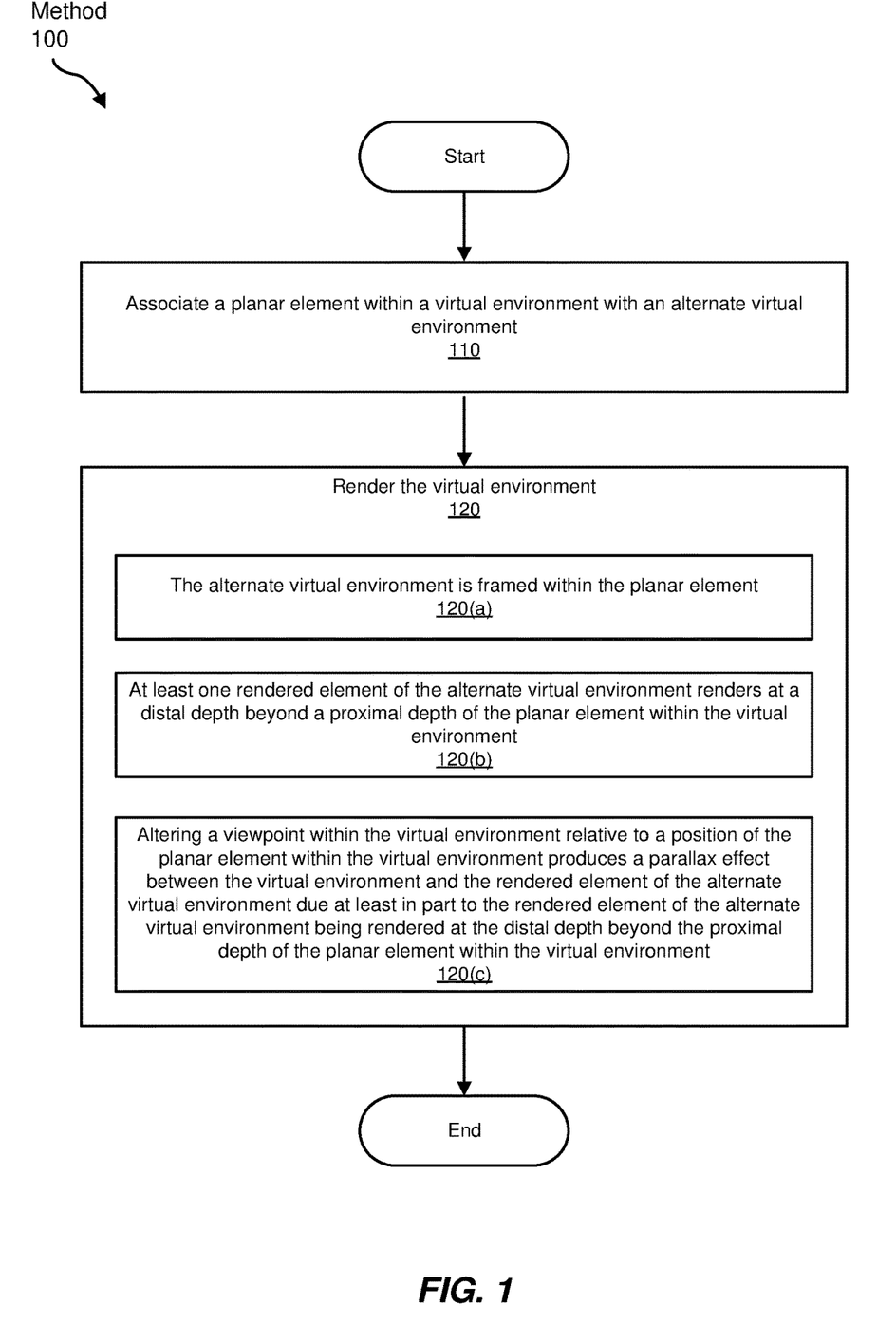
FIG. 1 is a flow diagram of an exemplary method for providing immersive graphical interfaces.

The following will provide, with reference to FIG. 1, detailed descriptions of a computer-implemented method for providing immersive graphical interfaces. In addition, detailed descriptions of exemplary virtual environments (and views thereof) will be provided in connection with FIGS. 2-11. Furthermore, detailed descriptions of an exemplary system for providing immersive graphical interfaces will be provided in connection with FIG. 12.

FIG. 1 is a flow diagram of an exemplary computer-implemented method 100 for providing immersive graphical interfaces. The steps shown in FIG. 1 may be performed by any suitable computer-executable code and/or computing system, including the system(s) illustrated in FIG. 12. In one example, each of the steps shown in FIG. 1 may represent an algorithm whose structure includes and/or is represented by multiple sub-steps, examples of which will be provided in greater detail below.

As illustrated in FIG. 1, at step 110 one or more of the systems described herein may associate a planar element within a virtual environment with an alternate virtual environment.

In some embodiments, the term "virtual environment" may refer to a three-dimensional model. For example, a virtual reality system may present a view of a virtual environment to a user by assigning a viewpoint within a three-dimensional model to the user. In some examples, the virtual reality system may modify the viewpoint responsive to input from the user (including, e.g., head movements and/or other body movements that would naturally and analogously modify the user's viewpoint in the real world). In some examples, a user may interact with and/or manipulate elements of the virtual environment through inputs to the virtual reality system.

The virtual environment may represent any of a variety of types of environments. In some examples, the virtual environment may represent the environment of a virtual reality application (e.g., a game and/or a simulation application). In some examples, the virtual environment may include a graphical user interface. For example, the virtual environment may represent an interface environment and/or a menu environment from which the user of a virtual reality system may select one or more applications and/or functions of the virtual reality system.

In some embodiments, the term "planar element" may refer to a two-dimensional element (e.g., within a three-dimensional model). Additionally or alternatively, the term "planar element" may refer to an approximately two-dimensional element (e.g., a three-dimensional element with relatively little depth). In some examples, a face and/or a portion of the surface of a three-dimensional element may include the planar element. In some examples, the planar element may be represented as a stand-alone element within a larger model.

The planar element may represent any of a variety of types of graphical and/or virtual elements. In some examples, the planar element may represent an element of a graphical user interface. For example, the planar element may represent a tile that a user may select as an interface element to activate one or more functions and/or applications of a virtual reality system.

One or more systems described herein may associate the planar element within the virtual environment with the alternate virtual environment in any of a variety of contexts and in any of a variety of ways. For example, systems described herein may associate the planar element with the alternate virtual environment by identifying metadata attached to the planar element that designates the alternate virtual environment as pertaining to the planar element. In some examples, the alternate virtual environment may represent and/or be included within a virtual reality application. Accordingly, in some examples, the planar element may act as an interface element relating to the virtual reality application. Thus, systems described herein may associate the alternate virtual environment with the planar element based on an association between the planar element and the virtual reality application.

As mentioned above, in some examples the virtual environment may include a graphical user interface and the planar element may represent an element of the graphical user interface. In these examples, systems described herein may receive, via the graphical user interface, an input directed to the planar element. For example, a user may virtually touch, target, grasp, move, and/or otherwise interact with the planar element within the virtual environment. Systems described herein may then perform an action relating to a virtual reality application that includes the alternate virtual environment, responsive to having identified an association between the planar element and the alternate virtual environment and having detected the input directed to the planar element. For example, systems described herein may load the virtual reality application, activate a function of the virtual reality application, show a demo of the virtual reality application, rate the virtual reality application, share the virtual reality application with another user, and/or initiate a purchase, a download, and/or an installation of the virtual reality application. In some examples, as will be explained in greater detail below, the systems described herein may replace the virtual environment with the alternate virtual environment.

As illustrated in FIG. 1, at step 120 one or more of the systems described herein may render the virtual environment according to characteristics 120(a), 120(b), and 120(c).

Systems described herein may render the virtual environment such that the alternate virtual environment is framed within the planar element. For example, whereas a virtual reality system may render various elements within a virtual environment by showing textures on the surfaces of the elements, systems described herein may dynamically show a view of the alternate virtual environment on the surface of the planar element. Additionally or alternatively, systems described herein may use a ray casting technique to render portions of the virtual environment and may propagate rays that intersect with the planar element along to the alternate virtual environment to determine what is projected onto the user's viewpoint via the planar element.

In addition, systems described herein may render at least one rendered element of the alternate virtual environment at a distal depth beyond a proximal depth of the planar element within the virtual environment. For example, although the planar element may be a given distance from the user's viewpoint, elements within the alternate virtual environment may be rendered as being at greater distances from the user's viewpoint.

Systems described herein may render alternate virtual environments with any of a variety of degrees of complexity and/or dimensionality. For example, the alternate virtual environment may be rendered on a single plane (e.g., at a depth beyond the depth of the planar element). In some examples, the alternate virtual environment may be rendered on multiple parallel planes at varying depths beyond the depth of the planar element (e.g., the planes at varying depths thereby exhibiting parallax effects relative to each other when the user's viewpoint changes). In some examples, the alternate virtual environment may be rendered as a three-dimensional model (e.g., with elements at arbitrary depths and with arbitrary orientations).

As may be appreciated from the foregoing discussion, altering the user's viewpoint within the virtual environment relative to the position of the planar element within the virtual environment may produce a parallax effect between the virtual environment and the rendered element of the alternate virtual environment due to the rendered element of the alternate virtual environment being rendered at a different, more distant, depth in comparison to the depth of the planar element within the virtual environment. Thus, when the user's viewpoint changes within the virtual environment (e.g., laterally relative to the face of the planar element), the apparent shift of the planar element in the user's field of view may be greater than the apparent shift of the rendered element of the alternate virtual environment in the user's field of view. In addition, as a consequence of the foregoing, when the user's viewpoint changes, the user may see different areas of the alternate virtual environment and/or see elements within the alternate virtual environment from different angles.

In some examples, altering the viewpoint within the virtual environment relative to the position of the planar element within the virtual environment may include altering the viewpoint within the virtual environment. Thus, the user may acquire a different view of the alternate virtual environment via the planar element through a change of viewpoint (whether programmatically, by user input, or both).

Additionally or alternatively, altering the viewpoint within the virtual environment relative to the position of the planar element within the virtual environment may include altering the position of the planar element within the virtual environment. Thus, the user may acquire a different view of the alternate virtual environment via the planar element when the planar element moves (whether programmatically, by user input, or both).

Although systems described herein may render the virtual environment as if the alternate virtual environment were beyond the planar element, these systems may nevertheless render elements of the virtual environment behind the planar element when the user's viewpoint changes (e.g., by moving around the planar element and/or by viewing the elements of the virtual environment that were previously behind the planar element from an oblique angle). As another example, these systems may render elements of the virtual environment behind the planar element when the planar element moves, shrinks, and/or disappears. Thus, systems described herein may render the virtual environment such that altering the user's viewpoint within the virtual environment relative to the position of the planar element within the virtual environment reveals a portion of the virtual environment otherwise obscured by the planar element.

Figure 2:
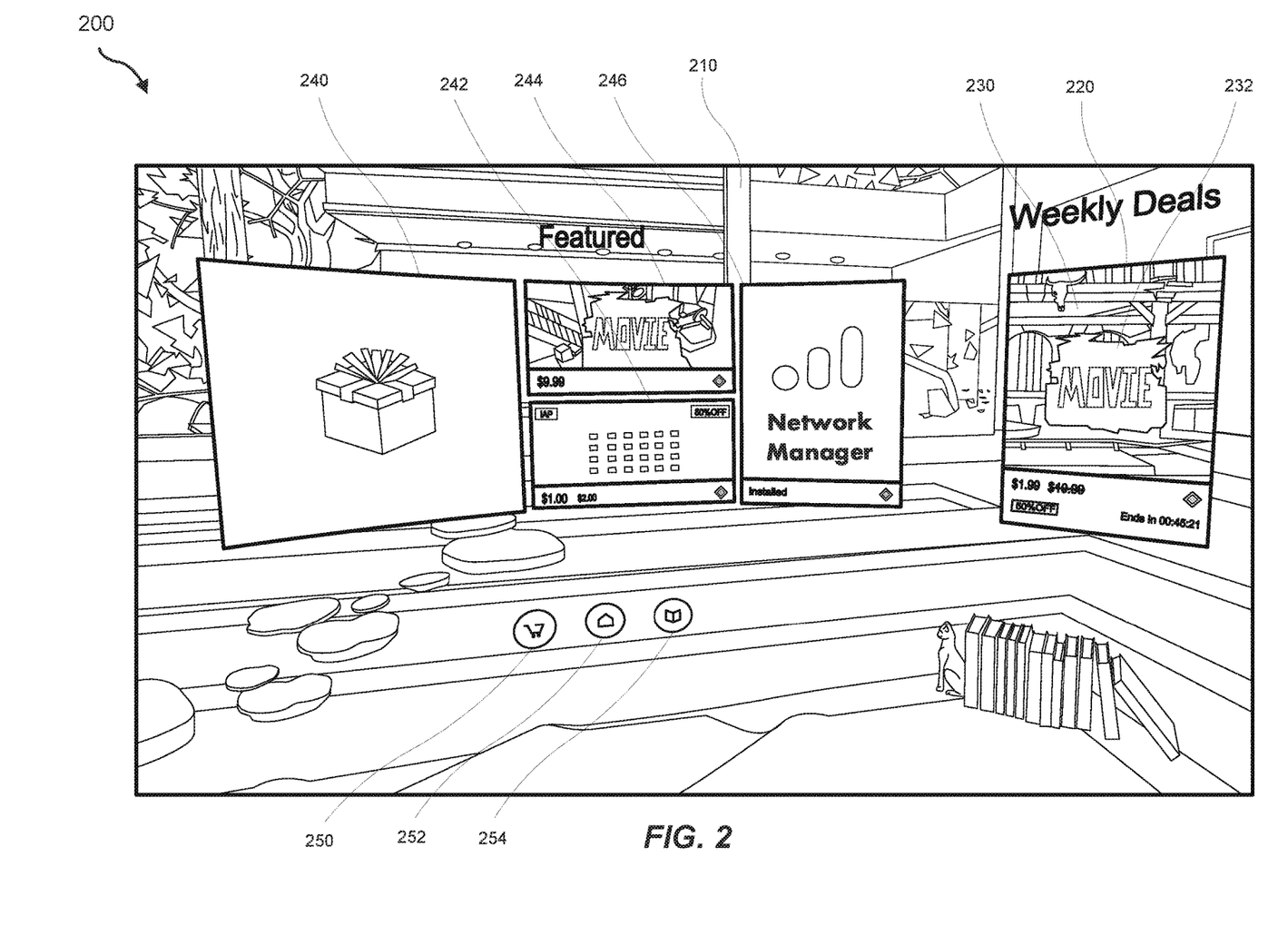
FIG. 2 is an illustration of an exemplary immersive graphical environment showing an alternate virtual environment.

FIG. 2 illustrates a virtual reality view 200. As shown in FIG. 2, view 200 may include a virtual environment 210. Virtual environment 210 may include a tile 220. Tile 220 may show an alternate virtual environment 230. In addition, in some examples, tile 220 may also show a title element 232. Virtual environment 210 may also include tiles 240, 242, 244, and 246. In addition, virtual environment 210 may include icons 250, 252, and 254. In some examples, virtual environment 210 may represent a menu environment within which a user may navigate a virtual reality system (e.g., to browse available virtual reality applications). Thus, tiles 220, 240, 242, 244, and 246, as well as icons 250, 252, and 254, may represent two-dimensional user interface elements within virtual environment 210.

Figure 3:
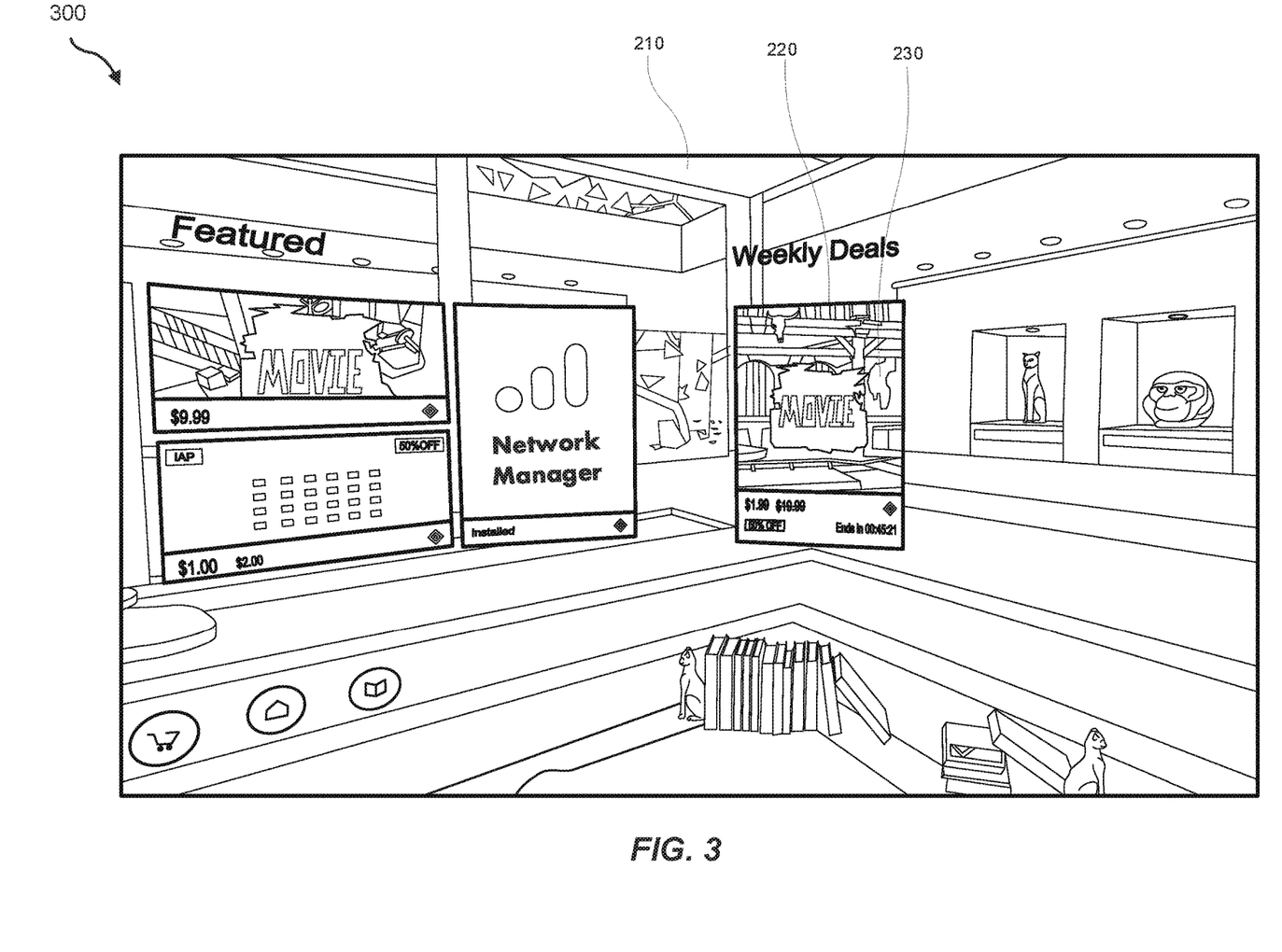
FIG. 3 provides another view of the immersive graphical environment.

FIG. 3 illustrates a virtual reality view 300. View 300 may represent a different view of virtual environment 210 from that shown in FIG. 2. For example, a user may have turned to the right (e.g., without otherwise significantly changing her viewpoint within virtual environment 210). Accordingly, the user may see substantially the same aspects of alternate virtual environment 230 within the frame of tile 220.

Figure 4:
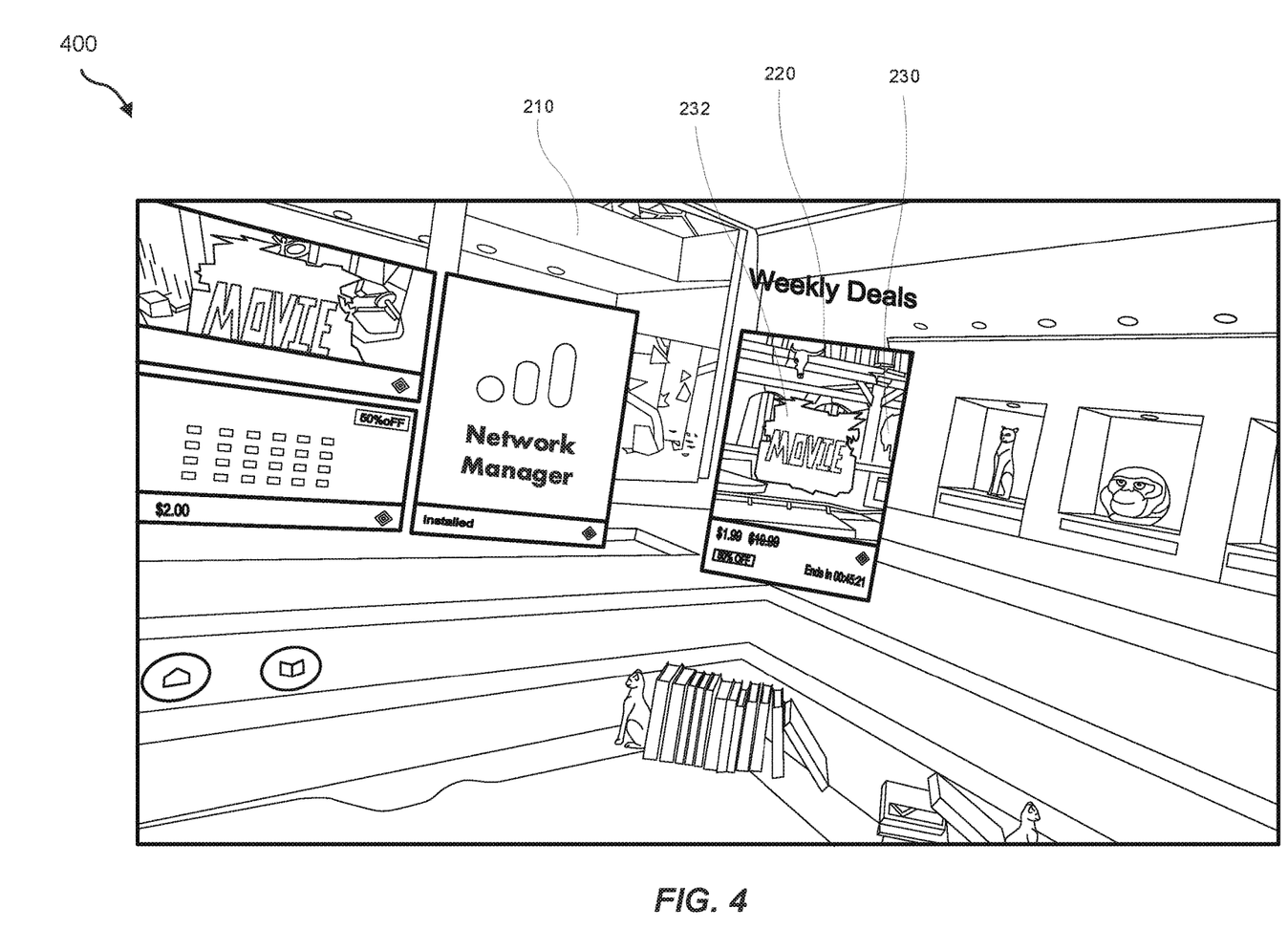
FIG. 4 provides an additional view of the immersive graphical environment.

FIG. 4 illustrates a virtual reality view 400. View 400 may represent a different view of virtual environment 210 from that shown in FIGS. 2-3. For example, the user may have tilted her head to the left and moved her head laterally to the right. Accordingly, the user's view of alternate virtual environment 230 via tile 220 may have changed due to the parallax effect between tile 220 and the elements of alternate virtual environment 230 (e.g., because the visible elements of alternate virtual environment 230 are rendered as at a greater depth than tile 220). In addition, as may be appreciated, title element 232 may be rendered at the same depth as tile 220 within virtual environment 210 and, therefore, may not appear to move relative to the frame of tile 220.

Figure 5:
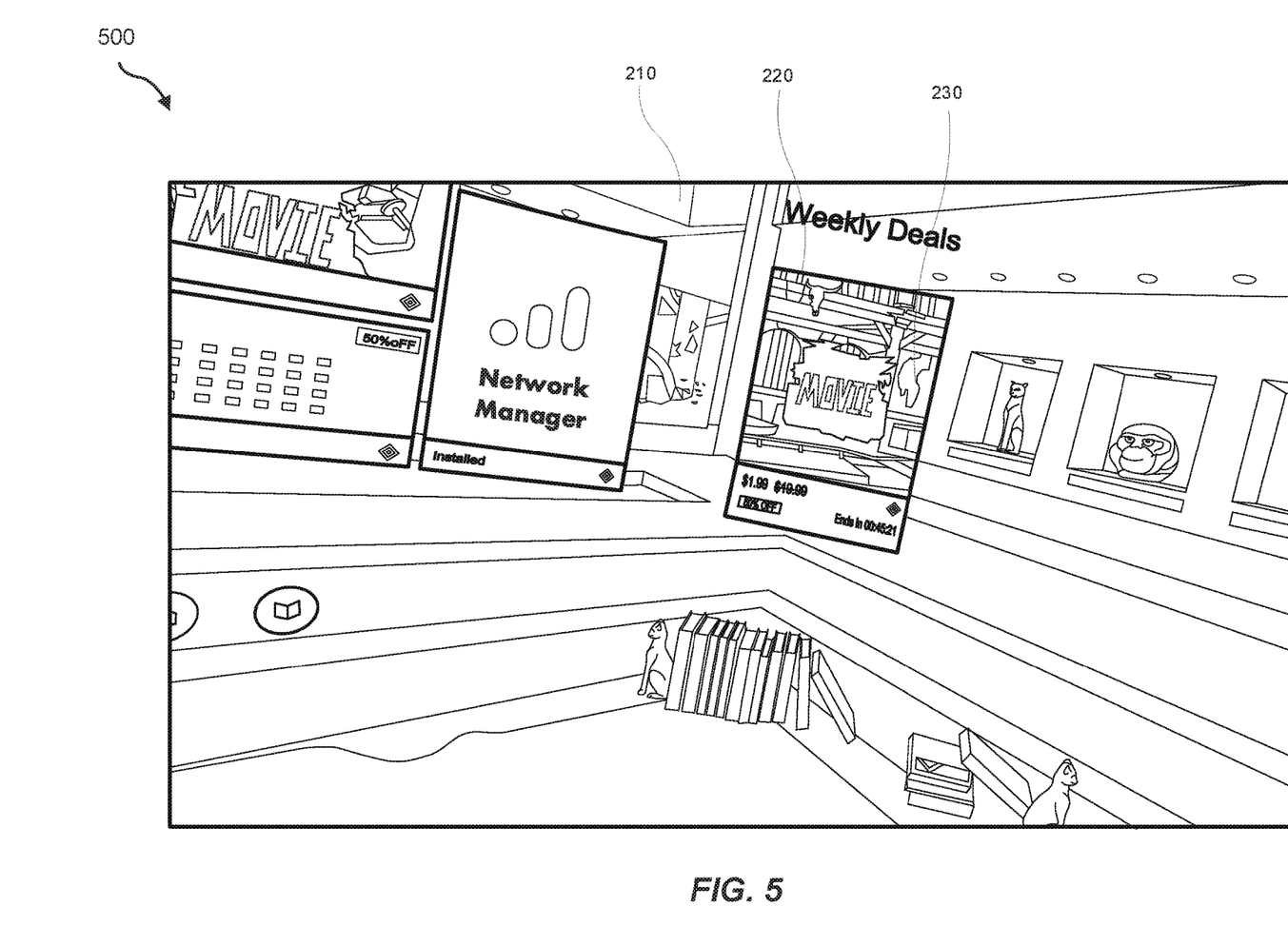
FIG. 5 provides a further view of the immersive graphical environment.

FIG. 5 illustrates a virtual reality view 500. View 500 may represent a different view of virtual environment 210 from that shown in FIGS. 2-4. For example, the user may have tilted her head to the right and moved her head laterally to the left. Accordingly, the user's view of alternate virtual environment 230 via tile 220 may have again changed due to the parallax effect between tile 220 and the elements of alternate virtual environment 230.

Figure 6:
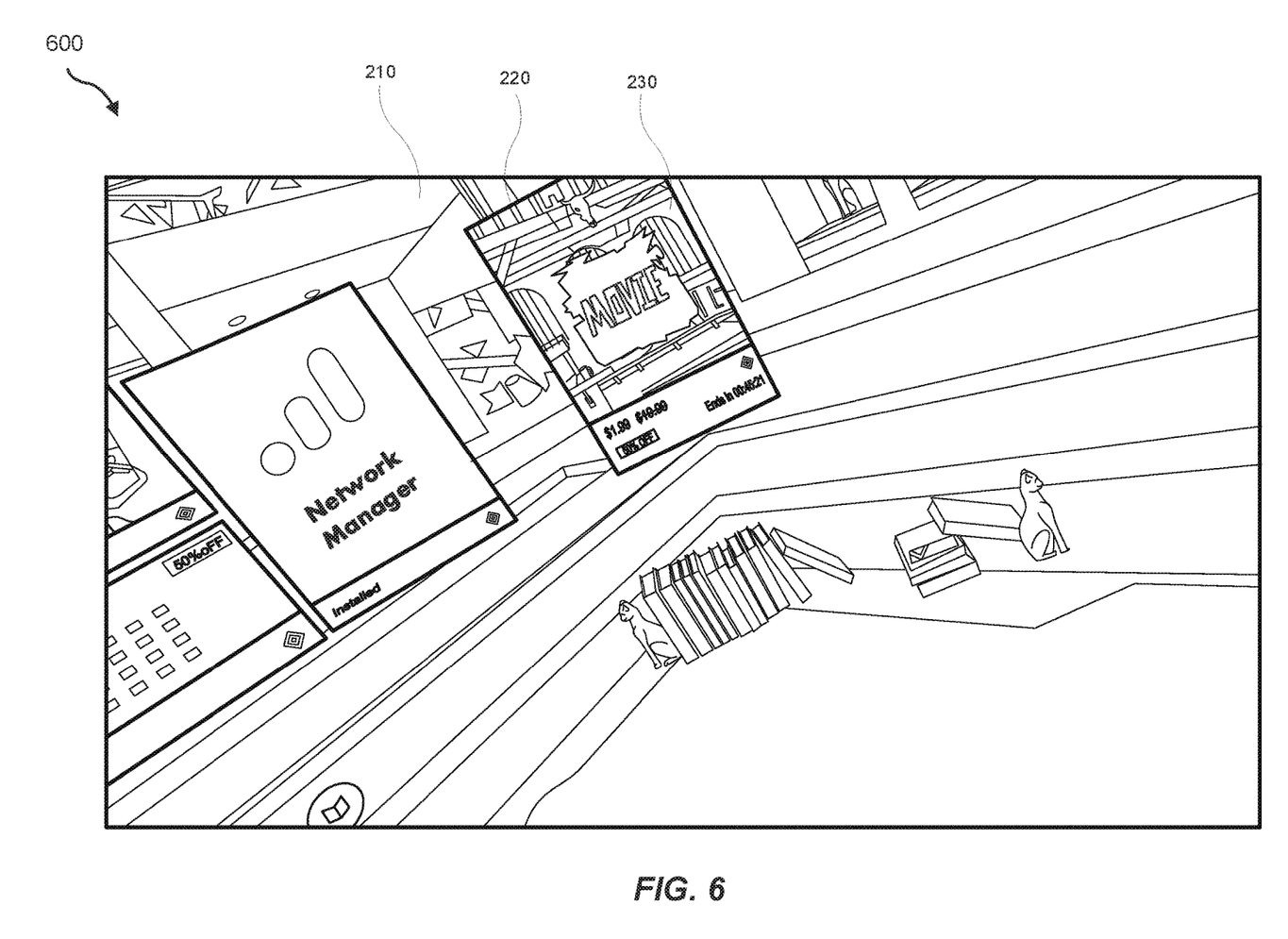
FIG. 6 provides another view of the immersive graphical environment.

FIG. 6 illustrates a virtual reality view 600. View 600 may represent a different view of virtual environment 210 from that shown in FIGS. 2-5. For example, the user may have tilted her head to the right and moved her head laterally to the right. Accordingly, the user's view of alternate virtual environment 230 via tile 220 may have again changed due to the parallax effect between tile 220 and the elements of alternate virtual environment 230. For example, elements of alternate virtual environment 230 may appear to have shifted to the right in the user's field of view relative to tile 220 in the user's field of view (e.g., because tile 220, being at a lesser depth, shifts more rapidly to the left within the user's field of view when the user's head moves laterally to the right than do elements of alternate virtual environment 230, being at a greater depth).

Figure 7:
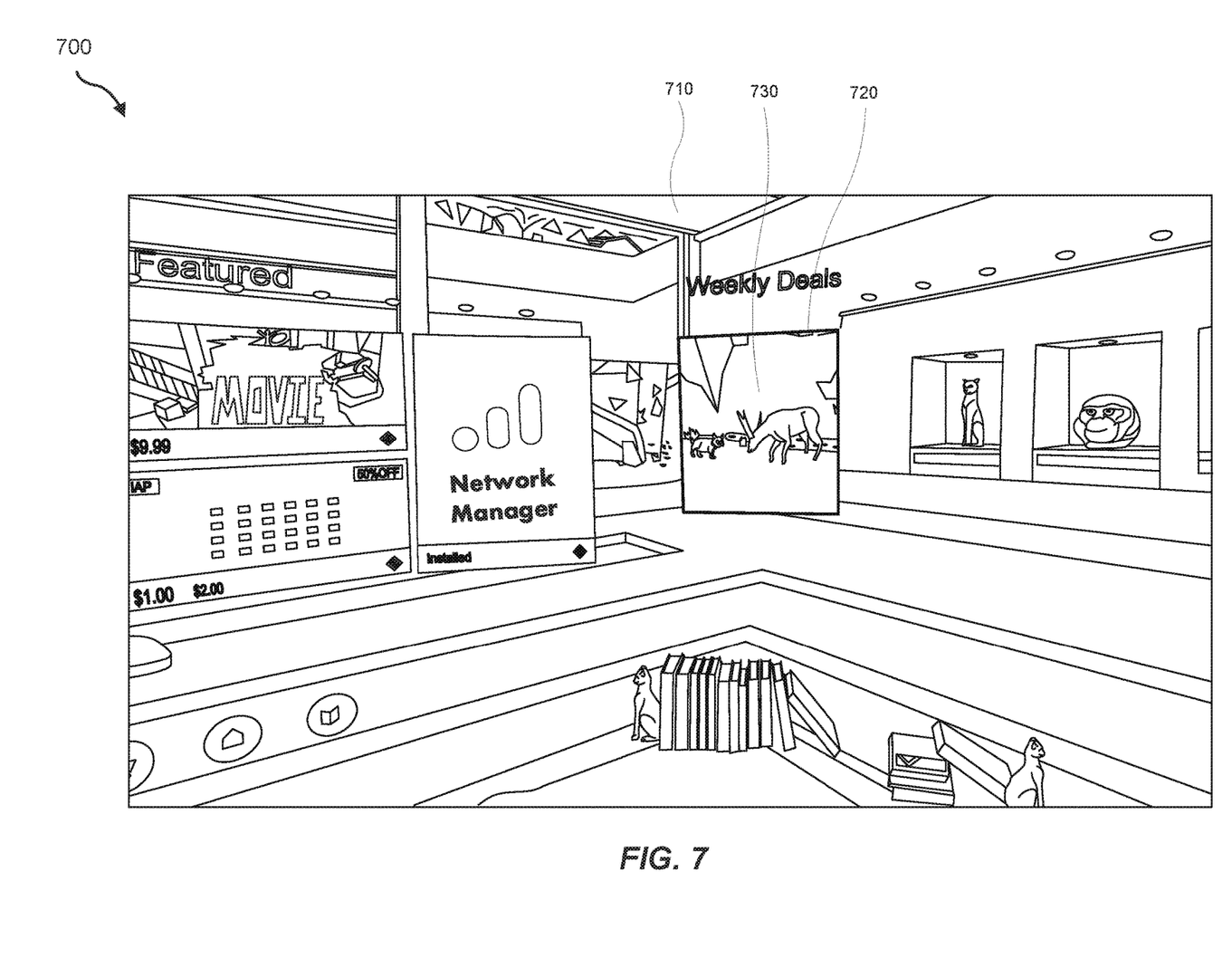
FIG. 7 is an illustration of an exemplary immersive graphical environment showing an alternate virtual environment.

In some examples, as discussed earlier, the alternate virtual environment may replace the virtual environment in the user's view (e.g., via an interaction with the planar element). As an example, FIG. 7 illustrates a virtual reality view 700. View 700 may include a virtual environment 710. In some examples, a tile 720 within virtual environment 710 may represent a graphical user interface element. In addition, tile 720 may show an alternate virtual environment 730. As will be discussed further below, when the user interacts with (e.g., selects) tile 720, the systems described herein may replace virtual environment 710 with alternate virtual environment 730, leaving the user immersed within alternate virtual environment 730.

Figure 8:
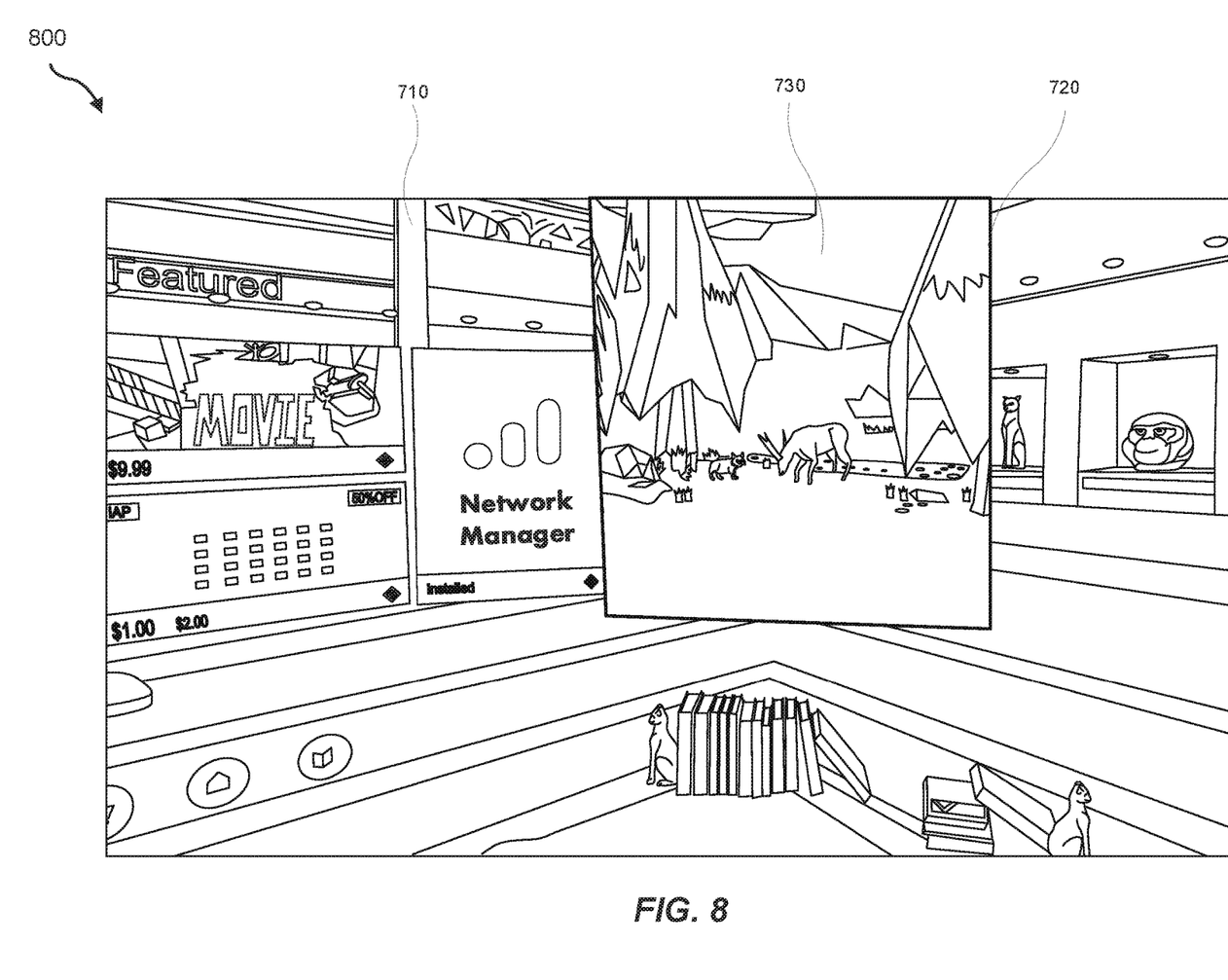
FIG. 8 shows the immersive graphical environment of FIG. 7 in the process of being replaced by the alternate virtual environment of FIG. 7.

FIG. 8 shows a virtual reality view 800. View 800 may follow view 700 and may show virtual environment 710 in a different state than that shown in FIG. 7. For example, the user may have selected tile 720, causing tile to progressively move closer to the user's viewpoint, thereby causing alternate virtual environment 730 to consume a greater proportion of the user's field of view.

Figure 9:
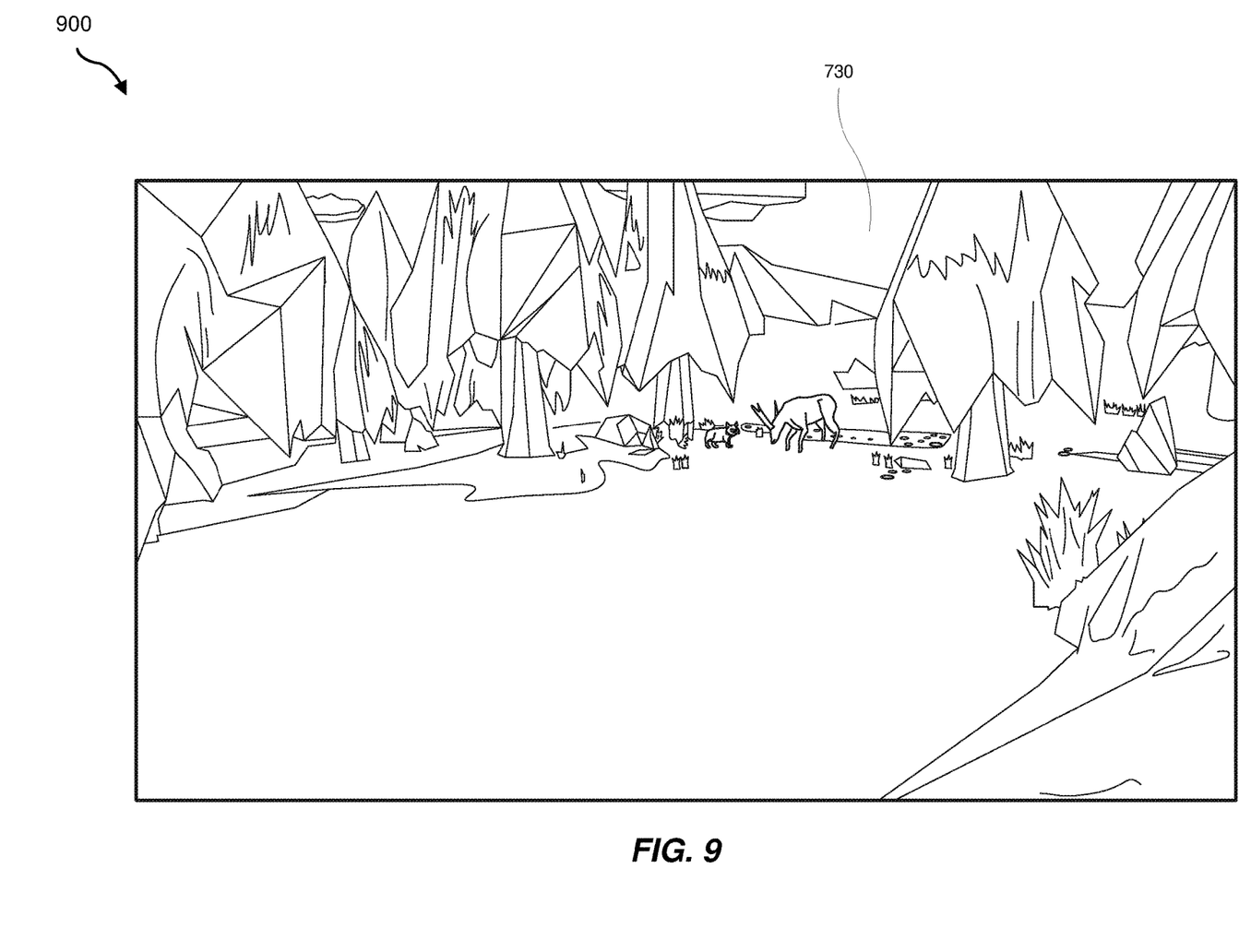
FIG. 9 shows the immersive graphical environment of FIG. 7 replaced with the alternate virtual environment shown in FIG. 7.

FIG. 9 shows a virtual reality view 900. View 900 follow view 800 and may show alternate virtual environment 730 (e.g., after tile 720 reached the user's viewpoint, thereby causing alternate virtual environment 730 to consume the entirety of the user's field of view). In some examples, once tile 720 reaches the user's viewpoint, tile 720 may disappear (e.g., because tile 720 is an element within virtual environment 710 and the user has become immersed in alternate virtual environment 730.

Figure 10:
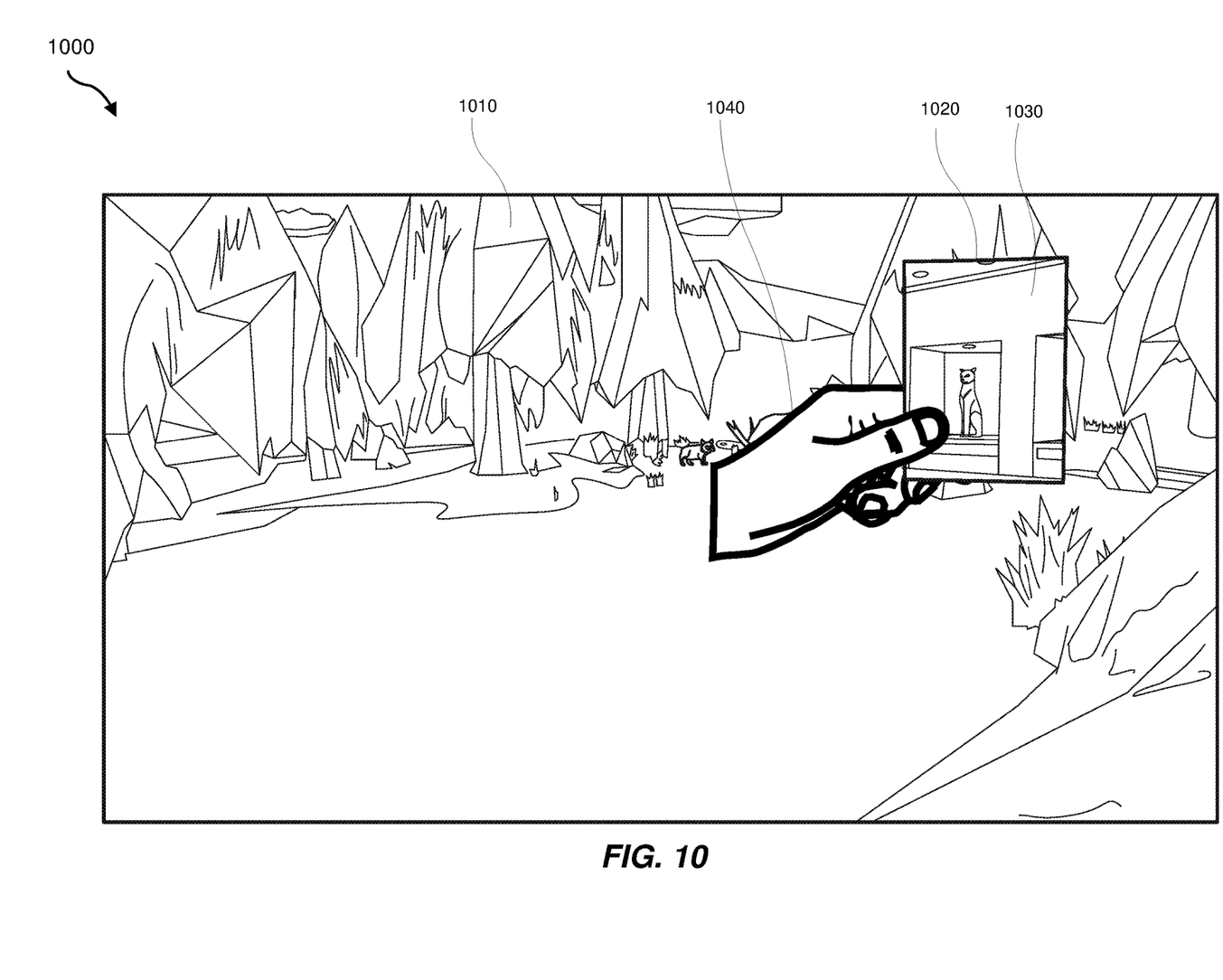
FIG. 10 is an illustration of an exemplary immersive graphical environment showing an alternate virtual environment.

In some examples, the user may interact with the planar element by causing the planar element to move within the virtual environment. As an example, FIG. 10 illustrates a virtual reality view 1000. View 1000 may include a virtual environment 1010. Virtual environment 1010 may include a tile 1020 that shows an alternate virtual environment 1030 (e.g., corresponding to virtual environment 210 shown in FIGS. 2-6 and/or virtual environment 710 in FIGS. 7-9). In some examples, a virtual hand 1040 (e.g., controlled by the user's hand movements) may reach out to and grasp tile 1020.

Figure 11:
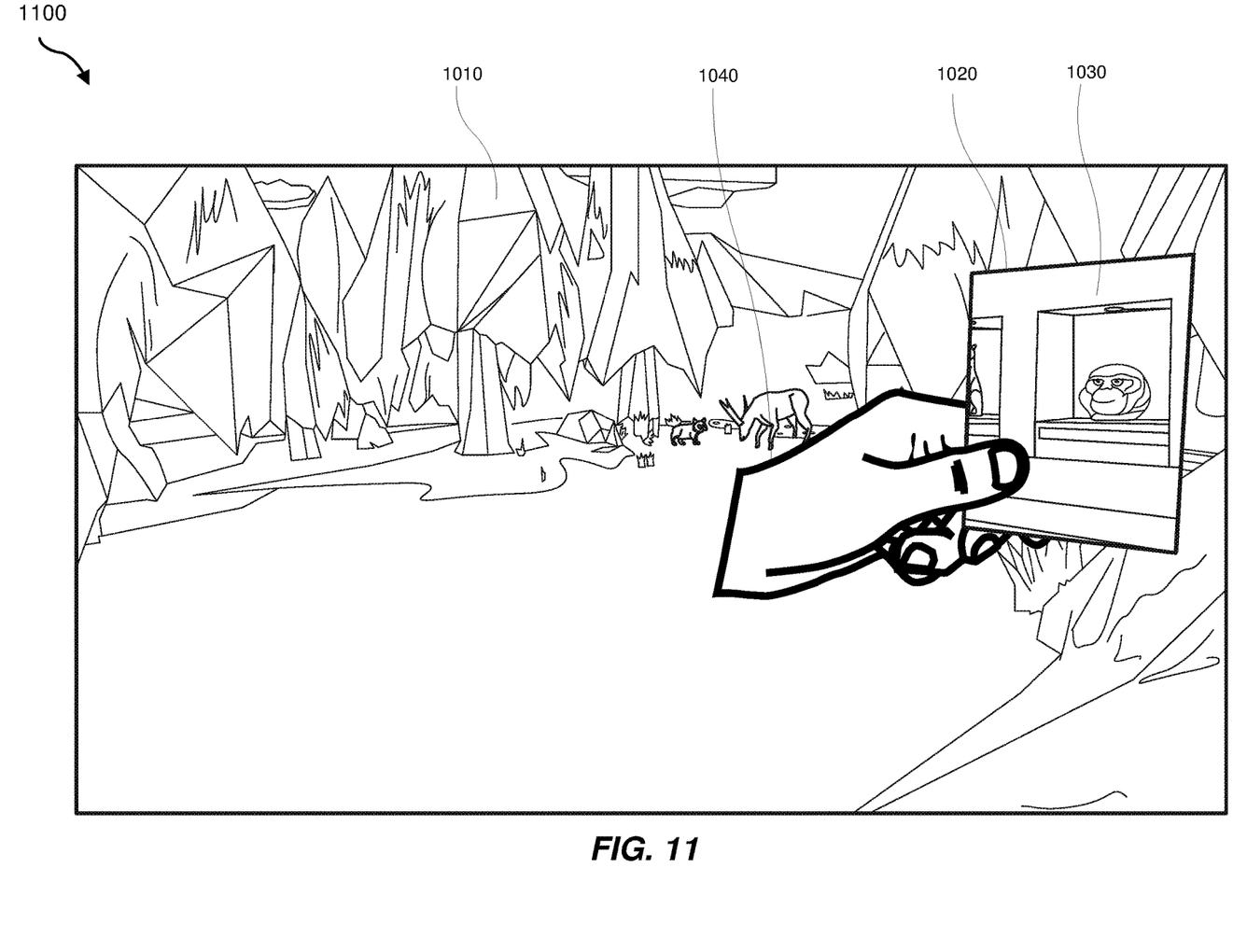
FIG. 11 shows the immersive graphical environment of FIG. 10 with a different view of the alternate virtual environment of FIG. 10.

FIG. 11 illustrates a virtual reality view 1100. View 1100 may show virtual environment 1010 in a different state than that shown in FIG. 10. For example, the user may have brought her hand inward and rotated her hand toward her right side, causing virtual hand 1040 to make similar movements within virtual environment 1010. Because virtual hand 1040 is grasping tile 1020, tile 1020 also moves within virtual environment 1010. Accordingly the user has a different view of virtual environment 1030 (without, e.g., having changed her viewpoint within virtual environment 1010). In some examples, by investigating alternate virtual environment 1030 in this manner, the user may decide whether and/or how to interact with tile 1020.

Figure 12:
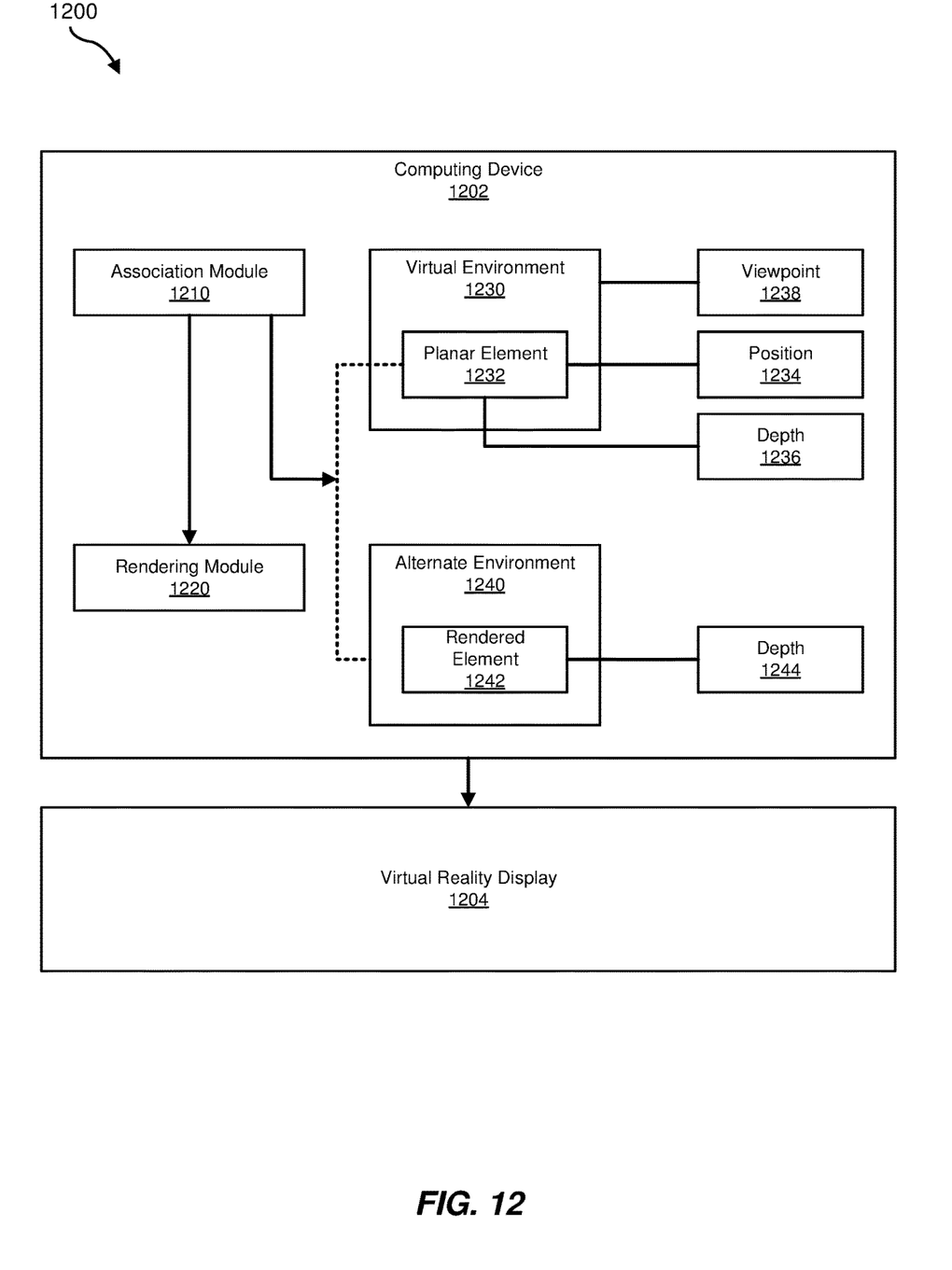
FIG. 12 is a block diagram of an exemplary system for providing immersive graphical interfaces.

FIG. 12 illustrates a system 1200 for providing immersive graphical interfaces. As shown in FIG. 12, system 1200 may include a computing device 1202 in communication with a virtual reality display 1204. In one example, an association module 1210 and/or a rendering module 1220 may execute on computing device 1202. Association module 1210 may associate a planar element 1232 within a virtual environment 1230 with an alternate virtual environment 1240. Rendering module 1220 may render virtual environment 1230 such that (i) alternate virtual environment 1240 is framed within planar element 1232, (ii) at least one rendered element 1242 of alternate virtual environment 1240 renders at a distal depth 1244 beyond a proximal depth 1236 of planar element 1232 within virtual environment 1230, and (iii) altering a viewpoint 1238 within virtual environment 1230 relative to a position 1234 of planar element 1232 within virtual environment 1230 produces a parallax effect between virtual environment 1230 and rendered element 1242 of alternate virtual environment 1240 due at least in part to rendered element 1242 of alternate virtual environment 1240 being rendered at distal depth 1244 beyond proximal depth 1236 of planar element 1232 within virtual environment 1230.

As explained above, by providing two-dimensional graphical interface elements embedded within an immersive three-dimensional, the systems and methods described herein may provide intuitive and easily navigable interfaces while maintaining immersion and engagement with a virtual environment. In addition, by showing an alternate virtual environment via an interface element, these systems and methods may simultaneously improve immersion while conveying information about the interface element. By showing the alternate virtual environment with a parallax effect, these systems and methods may further improve immersion as well as enable a user to intuitively gather additional information (e.g., in the form of different views of the alternate virtual environment) through natural movements (e.g., head movements to view the alternate virtual environment from a different angle and/or hand movements to move the interface element to provide different views of the alternate virtual environment).

As detailed above, the computing devices and systems described and/or illustrated herein broadly represent any type or form of computing device or system capable of executing computer-readable instructions, such as those contained within the modules described herein. In their most basic, configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors. Application-Specific integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a virtual environment model to be transformed, transform the virtual environment mode, output a result of the transformation to a virtual reality display, use the result of the transformation to provide a graphical interface, and store the result of the transformation to provide a view of an alternate virtual environment, within a virtual environment. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may Include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or Include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (I.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    associating a virtual planar element within a virtual environment with an alternate virtual environment, wherein:
        the virtual environment comprises a three-dimensional model comprising a set of virtual elements;
        the alternate virtual environment comprises a different three-dimensional model comprising a different set of virtual elements than the set of virtual elements included in the three-dimensional model of the virtual environment; and
        the virtual planar element represents a virtual interface element of the virtual environment; and
    rendering, relative to a viewpoint of a user, a view of the virtual environment and a view of the alternate virtual environment such that:
        the view of the alternate virtual environment is framed within the virtual planar element within the view of the virtual environment such that the virtual planar element within the virtual environment displays the view of the alternate virtual environment;
        at least one rendered element of the alternate virtual environment renders at a distal depth beyond a proximal depth of the virtual planar element within the virtual environment; and
        altering the viewpoint within the virtual environment relative to a position of the virtual planar element within the virtual environment changes a view of the rendered element of the alternate virtual environment as displayed by the virtual planar element and produces a parallax effect between the virtual environment and the rendered element of the alternate virtual environment due at least in part to the rendered element of the alternate virtual environment being rendered at the distal depth beyond the proximal depth of the virtual planar element within the virtual environment.

2. The computer-implemented method of claim 1, wherein rendering the virtual environment comprises rendering the virtual environment within a virtual reality system.

3. The computer-implemented method of claim 1, wherein:
    the virtual environment comprises a graphical user interface; and
    the planar element comprises an element of the graphical user interface.

4. The computer-implemented method of claim 3, further comprising:
    receiving, via the graphical user interface, an input directed to the planar element; and
    performing an action relating to a virtual reality application that comprises the alternate virtual environment, wherein the action is responsive to:
        identifying an association between the planar element and the alternate virtual environment; and
        the input directed to the planar element.

5. The computer-implemented method of claim 4, wherein performing the action comprises replacing the virtual environment with the alternate virtual environment.

6. The computer-implemented method of claim 1, wherein rendering the virtual environment further comprises rendering the virtual environment such that altering the viewpoint within the virtual environment relative to the position of the planar element within the virtual environment reveals a portion of the virtual environment otherwise obscured by the planar element.

7. The computer-implemented method of claim 1, wherein altering the viewpoint within the virtual environment relative to the position of the planar element within the virtual environment comprises altering the viewpoint within the virtual environment.

8. The computer-implemented method of claim 1, wherein altering the viewpoint within the virtual environment relative to the position of the planar element within the virtual environment comprises altering the position of the planar element within the virtual environment.

9. The computer-implemented method of claim 1, further comprising:
    receiving, via a virtual reality interface, an input to manipulate the planar element; and
    altering the viewpoint within the virtual environment relative to the position of the planar element within the virtual environment by manipulating the planar element in response to the input.

10. The computer-implemented method of claim 9, wherein receiving the input to manipulate the planar element comprises at least one of:

an input to manually grasp the planar element; or a hand movement after manually grasping the planar element.

11. A system comprising:

an association module, stored in memory, that associates a virtual planar element within a virtual environment with an alternate virtual environment, wherein:

the virtual environment comprises a three-dimensional model comprising a set of virtual elements;

the alternate virtual environment comprises a different three-dimensional model comprising a different set of virtual elements than the set of virtual elements included in the three-dimensional model of the virtual environment; and the virtual planar element represents a virtual interface element of the virtual environment;

a rendering module, stored in memory, that renders, relative to a viewpoint of a user, a view of the virtual environment and a view of the alternate virtual environment such that:

the view of the alternate virtual environment is framed within the virtual planar element within the virtual environment such that the virtual planar element displays the view of the alternate virtual environment;

at least one rendered element of the alternate virtual environment renders at a distal depth beyond a proximal depth of the virtual planar element within the virtual environment; and altering the viewpoint within the virtual environment relative to a position of the virtual planar element within the virtual environment changes a view of the rendered element of the alternate virtual environment as displayed by the virtual planar element and produces a parallax effect between the virtual environment and the rendered element of the alternate virtual environment due at least in part to the rendered element of the alternate virtual environment being rendered at the distal depth beyond the proximal depth of the virtual planar element within the virtual environment; and at least one physical processor that executes the association module and the rendering module.

12. The system of claim 11, wherein the rendering module renders the virtual environment within a virtual reality system.

13. The system of claim 11, wherein:

the virtual environment comprises a graphical user interface; and the planar element comprises an element of the graphical user interface.

14. The system of claim 13, further comprising an interface module that:

receives, via the graphical user interface, an input directed to the planar element; and performs an action relating to a virtual reality application that comprises the alternate virtual environment, wherein the action is responsive to:

identifying an association between the planar element and the alternate virtual environment; and the input directed to the planar element.

15. The system of claim 14, wherein the interface module performs the action by replacing the virtual environment with the alternate virtual environment.

16. The system of claim 11, wherein the rendering module further renders the virtual environment such that altering the viewpoint within the virtual environment relative to the position of the planar element within the virtual environment reveals a portion of the virtual environment otherwise obscured by the planar element.

17. The system of claim 11, wherein altering the viewpoint within the virtual environment relative to the position of the planar element within the virtual environment comprises altering the viewpoint within the virtual environment.

18. The system of claim 11, wherein altering the viewpoint within the virtual environment relative to the position of the planar element within the virtual environment comprises altering the position of the planar element within the virtual environment.

19. The system of claim 11, further comprising an interface module that:

receives, via a virtual reality interface, an input to manipulate the planar element; and alters the viewpoint within the virtual environment relative to the position of the planar element within the virtual environment by manipulating the planar element in response to the input.

20. A non-transitory computer-readable medium comprising:

computer-readable instructions that, when executed by at least one processor of a computing device, cause the computing device to:

associate a virtual planar element within a virtual environment with an alternate virtual environment, wherein:

the virtual environment comprises a three-dimensional model comprising a set of virtual elements;

the alternate virtual environment comprises a different three-dimensional model comprising a different set of virtual elements than the set of virtual elements included in the three-dimensional model of the virtual environment; and the virtual planar element represents a virtual interface element of the virtual environment; and render, relative to a viewpoint of a user, a view of the virtual environment and a view of the alternate virtual environment such that:

the view of the alternate virtual environment is framed within the virtual planar element within the view of the virtual environment such that the virtual planar element within the virtual environment displays the view of the alternate virtual environment;

at least one rendered element of the alternate virtual environment renders at a distal depth beyond a proximal depth of the virtual planar element within the virtual environment; and altering the viewpoint within the virtual environment relative to a position of the virtual planar element within the virtual environment changes a view of the rendered element of the alternate virtual environment as displayed by the virtual planar element and produces a parallax effect between the virtual environment and the rendered element of the alternate virtual environment due at least in part to the rendered element of the alternate virtual environment being rendered at the distal depth beyond the proximal depth of the virtual planar element within the virtual environment.

* * * * *